March 2, 1965  J. F. SWIFT  3,171,352
FLUID PRESSURE VARIATOR
Filed Feb. 5, 1963  4 Sheets-Sheet 1
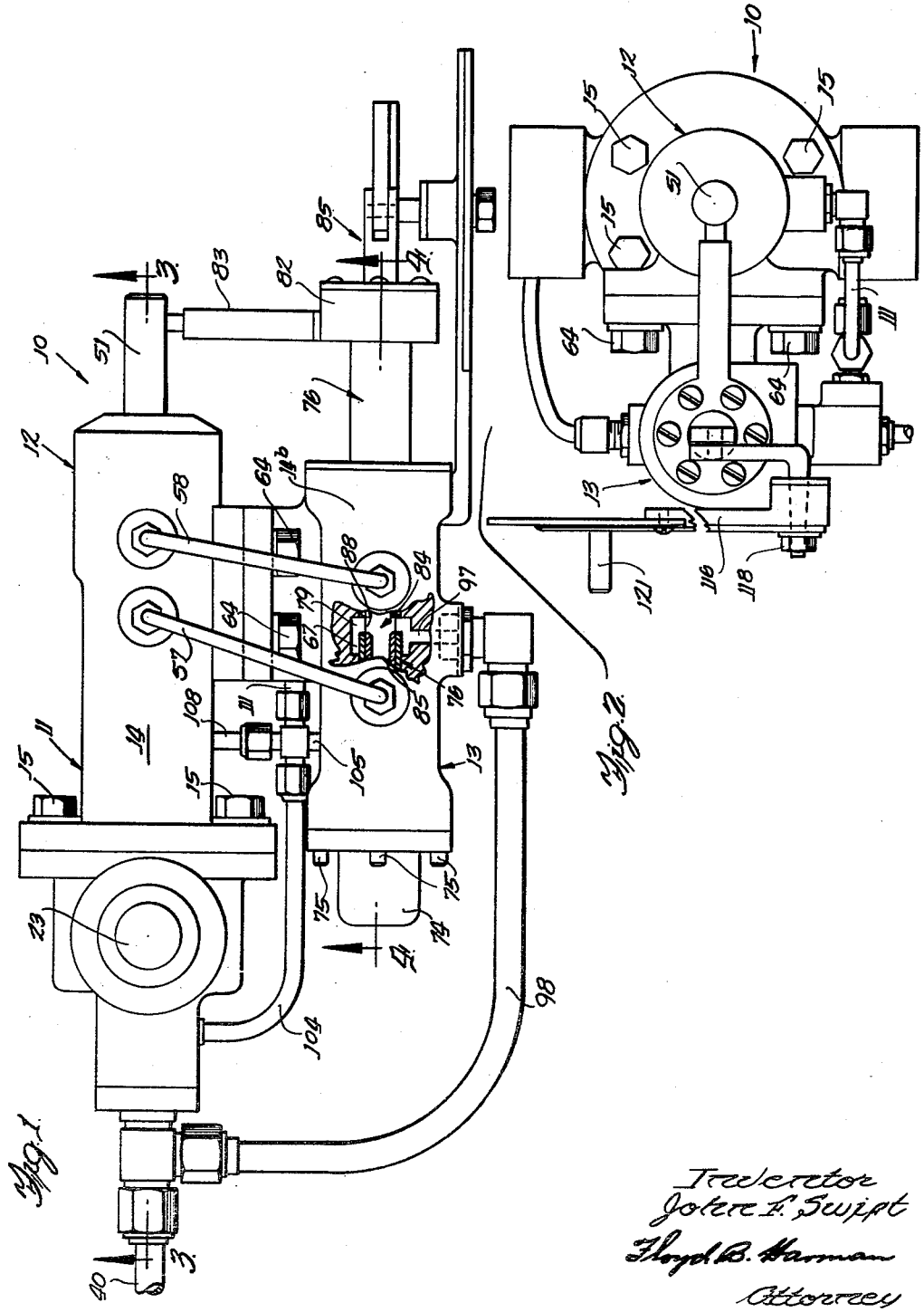
Inventor
John F. Swift
Floyd B. Harman
Attorney

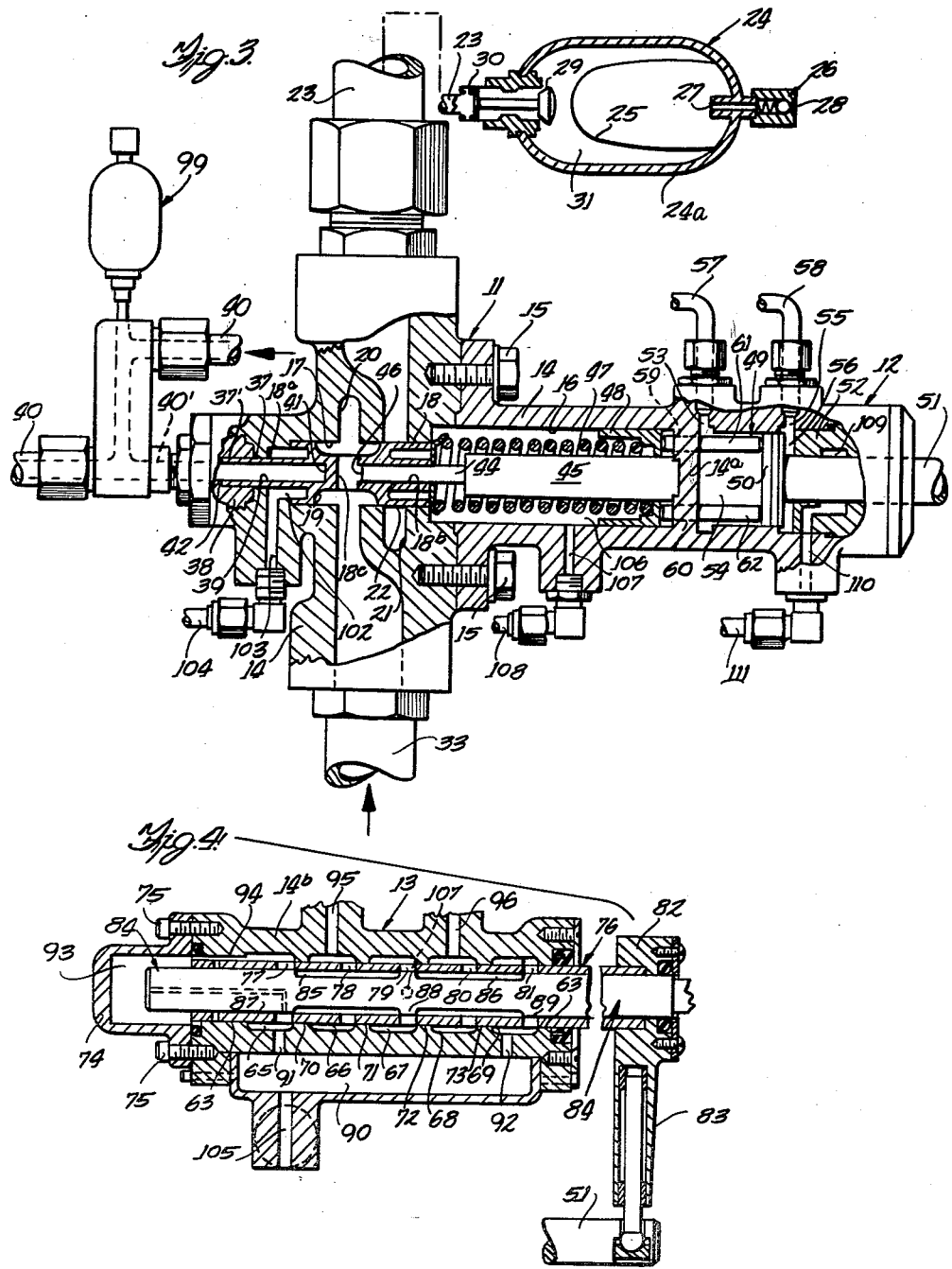

March 2, 1965 J. F. SWIFT 3,171,352
FLUID PRESSURE VARIATOR
Filed Feb. 5, 1963 4 Sheets-Sheet 3
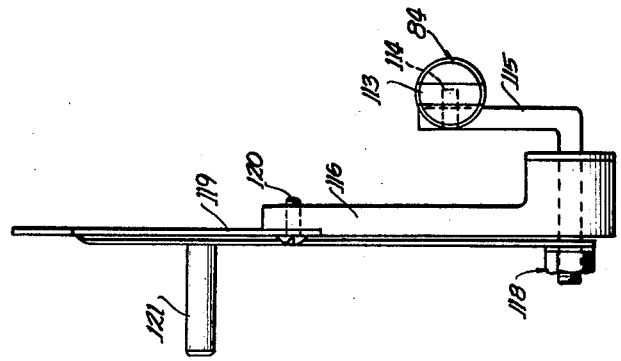
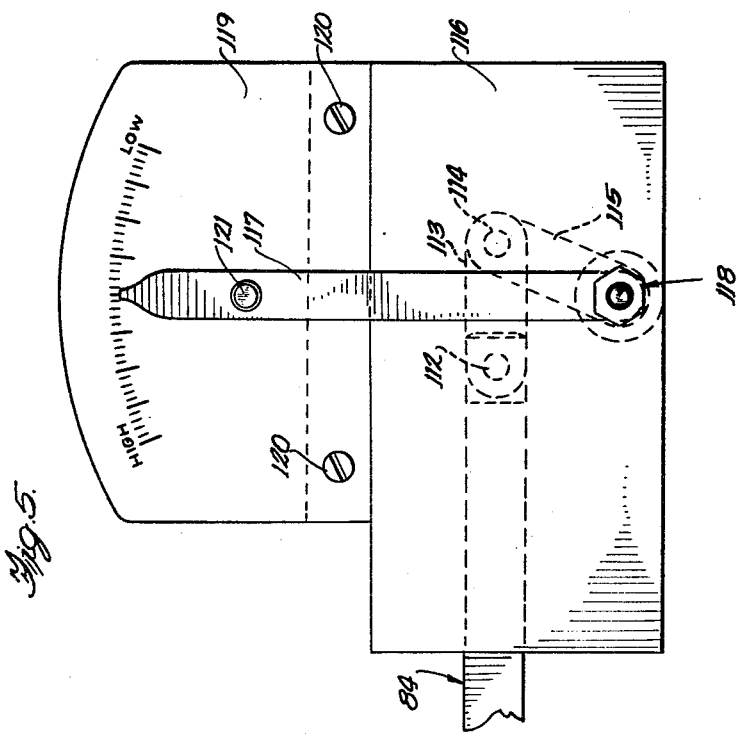
Inventor
John F. Swift
Lloyd R. Harman
Attorney

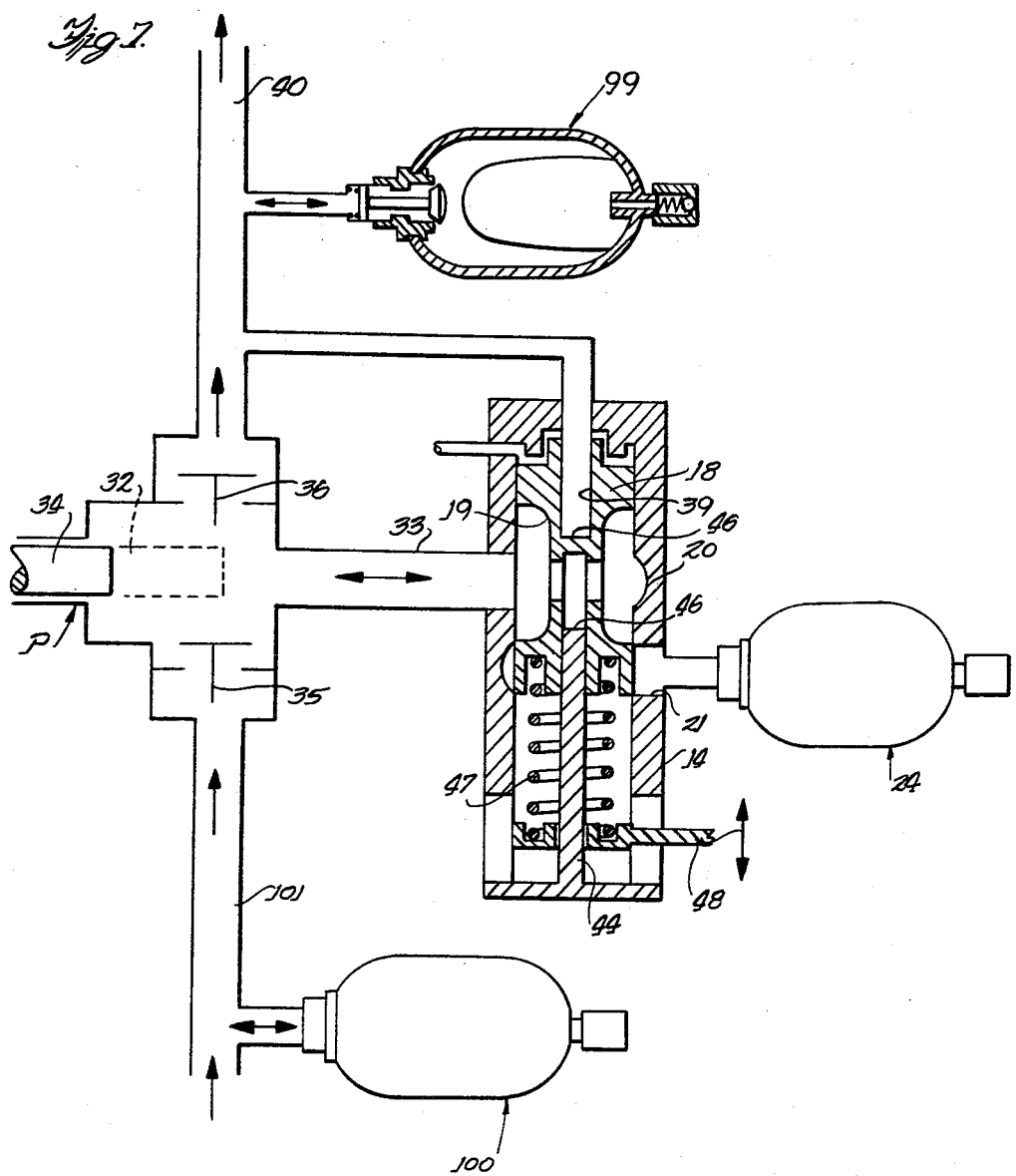

United States Patent Office 3,171,352
Patented Mar. 2, 1965

3,171,352
FLUID PRESSURE VARIATOR
John F. Swift, Chicago, Ill., assignor to International Harvester Company, Chicago, Ill., a corporation of New Jersey
Filed Feb. 5, 1963, Ser. No. 256,365
2 Claims. (Cl. 103—37)

This invention relates to a fluid pressure variator for a pulsating or intermittent delivery type of fluid pump. More in particular this invention relates to a pressure regulator device for controllably limiting the delivery pressure of a continuously operating pulsating fluid pump such as a piston pump or momentum pump.

Particularly in certain types of fluid pumping operations it is not permissible to regulate the operating speed of the pump as a function of the fluid pressure delivered. An example of this is where a free piston engine hydraulic pump is primarily employed as a gasifier for a turbine and secondarily to pump a liquid. In such instances a conventional relief valve may be used to limit the fluid pressure in the hydraulic system. However, the use of a relief valve for such purpose power is wasted and thus the pump's efficiency is correspondingly reduced. Also where the cyclic frequency of the pump is of a high order, such as a free piston engine hydraulic pump, valve action tends to become sluggish resulting in a further lowering of efficiency. Accordingly it is a prime object of the present invention to provide controllable means for regulating the delivery pressure of a continuously operating pulsating fluid pump.

A further important object of the present invention is to provide means for regulating the delivery pressure of a continuously operating pulsating fluid pump wherein the input energy applied to the pump is a direct function of the amount of fluid under pressure delivered to a receiver.

Another object of this invention is to provide means for regulating the delivery pressure of a continuously operating pulsating fluid pump according to the preceding objects which is particularly adapted for fluid pumped at high pressure.

A still further object of this invention is to provide means for varying the fluid flow at any predetermined pressure delivered by a continuously operating pulsating pump wherein the fluid flow rate is determined by the demand therefor.

These and other desirable objects inherent in and encompassed by the invention will be more readily understood from the ensuing description, the appended claims and the annexed drawings wherein:

FIGURE 1 is a plan view, partly broken away, of the invention in assembled form illustrating the general arrangement of the variator;

FIGURE 2 is an end-wise elevation of the assembly of FIGURE 1;

FIGURE 3 is a sectional view partly broken away, taken on line 3—3 of FIGURE 1 with tube fittings shown out of true position showing construction details of the mechanism for regulating the output fluid flow at a predetermined pressure;

FIGURE 4 is a sectional view partly broken away, taken on line 4—4 of FIGURE 1 with spool assembly rotated 90° out of position illustrating a telemetric fluid valve for energizing controllably a servo-motor to regulate adjustably the fluid delivery pressure of the variator;

FIGURE 5 is a front view, partly broken away, illustrating the manually operated control lever with graduated dial for setting the fluid delivery pressure of the variator;

FIGURE 6 is an end-wise view of the control lever and dial of FIGURE 5; and

FIGURE 7 is a diagram showing schematically the variator of this invention in an operating environment.

The term "pulsating pump" as used herein refers to those types of pumps which deliver fluid under pressure pulsatingly. A conventional single piston pump would be a pulsating pump for delivery is made when the piston moves in one direction (pumping stroke) and when it moves in the other direction draws fluid from a reservoir (intake stroke). An example of a rapid stroke free piston engine hydraulic pump of the pulsating type to which this invention refers is shown in an application for patent by Edwin A. Kariba and C. Paul Kolthoff, Jr., Serial No. 132,089, filed on August 17, 1961 and assigned to the same assignor herein.

Referring to the drawings the fluid pressure variator of this invention is generally referred to by the numeral 10 in FIGURE 1. The variator 10 includes a pressure regulating mechanism indicated at 11, a servo-motor 12 and a servo-valve 13.

Referring to FIGURE 3 the pressure regulating mechanism 11 includes a housing 14 which is made in two pieces, for manufacturing and assembling reasons, connected rigidly together as by bolts, three of which are shown at 15. Within the housing 14 is disposed a large bore 16 and a small bore 17 in coaxial alignment. Slidably disposed within the bore 17 is a valve plunger 18 having a circumferential groove 19 which groove is always in communication with circumferential groove 20 in the housing 14. The housing 14 is also provided with another circumferential groove 21 positioned in registrable relation with the groove 19 or land 22 of the plunger 18. The groove 21 communicates with conduit 23 which leads to a conventional fluid pressure accumulator generally indicated at 24.

The accumulator 24 may be conveniently comprised of a bulb 24a having a flexible bag 25 whose interior is sealingly connected to the outlet side of a check valve 26 through passage 27. From this it will be apparent that the flexible bag 25 may be inflated to any desired pressure by introducing an elastic fluid, such as air, nitrogen, etc., through the passage 28 leading to the inlet side of check valve 26.

The accumulator 24 may also be provided with a poppet type valve 29 urged toward open position by a compression spring 30. It will be observed from FIGURE 3 that as the pressure in chamber 31 decreases the volume of the bag 25 correspondingly increases, as is the case when the working fluid exhausts from the chamber 31 into conduit 23, the bag 25 thus engages the poppet valve 29 and urges it into closed position. This prevents damage to the bag 25 when the fluid in chamber 31 approaches exhaustion. Thus the gas filled bag 25 functions as a compressible element permitting a variable volume of working fluid in the chamber 31 flowing to and from the conduit 23.

Referring now to FIGURES 3 and 7 it will be seen that the circumferential groove 20 in the housing 14 communicates directly with the pumping chamber 32 of the pulsating pump P through conduit 33. The pump P includes a piston 34 driven reciprocatingly by a source of power (not shown). The pump P also includes an inlet check valve 35 and outlet check valve 36 shown schematically in FIGURE 7.

Again referring to FIGURE 3 it will be seen that the plunger 18 includes a tubular extension 18a slidably disposed in a small bore 37 in the housing 14 and a coextensive bore 37' in a threaded adapter 38 as shown. The axially disposed inner bore 39 of the tubular extension 18a communicates with the high pressure working circuit through connecting conduit 40. Since the high pressure working circuit is always in communication with the inner bore 39 of the plunger 18 it will be apparent that the fluid pressure therein exerts a piston action on the circular surface 41 and the annular surface 42 thereof which urges the plunger 18 in the rightward direction as viewed in FIGURE 3.

It will also be noted from FIGURE 3 that the plunger 18 is provided with axial bore 18b which is smaller in cross-sectional area than the inner bore 39. The bore 18b of plunger 18 is in slidable relation with a stationary pin 44 extending from a cylindrical rod 45 secured to the partition wall 14a of the housing 14. Further it will be seen that the plunger 18 is provided with a transverse bore 18c which communicates with circumferential groove 19 and the bore 18b. From this it will be apparent that fluid pressure in the bore 18b exerts a counter-reactive force on the circular surface 46 of the pin 44 but since the pin 44 is stationary the resulting fluid force urges the plunger 18 in the leftward direction as viewed in FIGURE 3.

Disposed within the larger bore 16 of the housing 14 concentric with the rod 45 is a compression spring 47 having one end in seating relation with the plunger 18 and the other end in seating relation with axially movable element 48, the element 48 being in slidable relation with respect to the rod 45 and large bore 16 as shown best in FIGURE 3. From this it will be apparent that the axial position of the valve plunger 18 is determined by the fluid pressure force in conduit 40 urging the plunger 18 rightwardly balanced by the sum of the forces exerted by the spring 47 and fluid pressure in the conduit 33 urging the plunger 18 leftwardly. Means will now be described for varying the axial position of element 48 which correspondingly varies the force exerted by the spring 47 on the plunger 18.

At the rightward end portion of FIGURE 3 the fluid servo-motor 12 comprises a two-way acting hydraulic ram generally indicated at 49. The ram 49 includes a piston 50, connecting rod 51 slidably disposed in the stationary adapter 52 of the housing 14, a hydraulic port 53 leading to cylinder chamber 54, and hydraulic port 55 leading to cylinder chamber 56. The port 53 communicates with conduit 57 and port 55 communicates with conduit 58.

The partition wall 14a is provided with a plurality of bores, two of which are shown in dotted lines in FIGURE 3, extending therethrough in equilateral spaced relation. Within each of said bores (e.g. 59, 60) is disposed a pin, two of which are shown at 61 and 62. One end of each of said pins 61, 62 is in abutting relation with the piston 50 and the other ends in abutting relation with the axially movable element 48 as shown although the pins 61, 62 may be rigidly connected to the piston 50 and element 48 if desired. From this it will be apparent that the element 48 will move axially corresponding to the movement of the piston 50. Means will now be described for energizing the servo-motor 12 to position the piston 50 selectively as desired including telemetric means for automatically maintaining the desired position of the piston 50.

Referring to FIGURE 4 the servo-valve 13 comprises an axial bore 63 within the valve housing 14b secured to the housing 14 as by a plurality of bolts 64. The bore 63 is provided with five circumferential grooves 65, 66, 67, 68 and 69 with lands 70, 71, 72 and 73 as shown. A closure cap 74 is secured to the end of the valve housing 14b such as by a plurality of bolts 75 as shown.

Disposed within the bore 63 in slidable relation is a valve sleeve indicated at 76 having ports 77, 78, 79, 80 and 81 which are always in communication with grooves 65, 66, 67, 68 and 69, respectively. As viewed in FIGURE 4 the rightward end of the valve sleeve 76 is rigidly connected to a lug 82 having an arm 83 the outer end of which is secured to the connecting rod 51. Thus it is apparent from FIGURES 1 and 4 that the position of piston 50 in the servo-motor 12 corresponds to the position of the valve sleeve 76 in the valve casing 14b.

Disposed slidably within the valve sleeve 76 and its associated lug 82 is a control valve element or spool indicated at 84 having circumferential grooves 85 and 86 and lands 87, 88 and 89 as shown in FIGURE 4. It will be noted from FIGURE 4 that the valve element 84 extends rightwardly of the lug 82 and that it is slidable with respect to the lug 82.

The circumferential grooves 65 and 69 communicate with the oil sump or reservoir 90 through passages 91 and 92, respectively, in the valve casing 14b. For venting the compartment 93 in the closure cap 74 a longitudinal groove 94 is provided in the bore 63 communicatively connecting the compartment 93 with circumferential groove 65 thus connecting the compartment 93 with sump 90. This means for venting prevents pressure changes in the compartment 93 due to fluid leakage thereinto or movement of the control valve element 84.

The circumferential groove 66 communicates with the cylinder chamber 54 (FIGURES 1, 3 and 4) through port 95, conduit 57 and port 53. Similarly circumferential groove 68 communicates with cylinder chamber 56 through port 96, conduit 58 and port 55.

The circumferential groove 67 communicates with the high fluid pressure source in conduit 40 through the port 97, shown in the break-away portion of FIGURE 1, and connecting conduit 98. Thus during operation the circumferential groove 67 is always under fluid pressure.

For purpose of storing fluid under pressure in the working circuit a second accumulator 99 is provided which is constructed similar to accumulator 24 previously described and functions for the same fluid pressure range. In addition if it is desired to employ inlet fluid to the pump P at super-atmospheric pressure (e.g. 100 p.s.i.) to avoid possible fluid cavitation a third accumulator 100 (FIGURE 7) is connected to the fluid inlet conduit 101. The sump 90 of FIGURE 4 is always at atmospheric pressure and connected to the same atmospheric pressure reservoir (not shown) from which inlet fluid to conduit 101 is either drawn directly or through a charging pump (not shown) discharging into conduit 101 for supplying inlet fluid at super-atmospheric pressure. The means for collecting drainage fluid arising from the exhaust of the servo-motor 12 and fluid leakage occurring in the variator 10 to sump 90 will now be described.

In the leftward portion of FIGURE 3 it will be seen that the housing 14 is provided with a circumferential groove 102 surrounding the tubular extension 18a of the valve plunger 18. The groove 102 communicates with sump 90 through port 103, and conduits 104 and 105 as seen in FIGURES 1 and 4. The conduit 105 is connected to a reservoir at atmospheric pressure (not shown) which provides inlet fluid to the pump P. The spring chamber 106 also communicates with conduit 105 through port 107 (FIGURE 3) and connecting conduit 108 (FIGURE 1). Likewise circumferential groove 109 surrounding connecting rod 51 of the servomotor 12 communicates with drain conduit 105 through port 110 and conduit 111 as seen in FIGURES 1, 2 and 3.

Referring now to FIGURES 5 and 6 it will be seen that the external or protruding portion of the control valve element 84 is pivotally connected at 112 to one end of link member 113. The other end of link 113 is pivotally connected at 114 to one leg of crank 115. The other leg of crank 115 extends through and is journalled for rotation in stationary bracket 116 rigidly secured to the valve housing 14b. The crank 115 is secured rigidly to a control lever 117 as by a conventional friction bolt assembly 118. Thus it is apparent that arcuate movement of the lever 117 correspondingly moves the control valve element 84 axially. A dial plate 119 may be secured to the bracket 116 as by screws 120 and the lever 117 provided with an outward extending handle 121 for manual control of its position with respect to the graduated scale on the dial plate 119. The operation of the variator 10 will now be explained.

*Operation*

Assume that the piston 50 of the servo-motor 12 is in the position illustrated in FIGURE 3 and also assume that the servo-valve 13 is in the position shown in FIGURE 4. Referring now to FIGURES 3 and 7 the movable elements 48 remains in a fixed position. Now as the piston 34 of pump P moves on its pumping stroke the fluid displaced passes through the outlet check valve 36 into conduit 40 of the working circuit and fluid pressure receiver such as the high pressure accumulator 99. As the pressure in accumulator 99 increases the fluid pressure in the inner bore 39 of the valve plunger 18 also correspondingly increases. It will be appreciated that when the pressure in accumulator 99 is sufficiently high to overcome the force of spring 47 alone the valve plunger 18 will move rightwardly during the period that the piston 34 of pump P is on its pumping stroke and will move leftwardly during the intake stroke of the piston 34. Thus the valve plunger 18 will oscillate and part of the fluid pumped will pass through check valve 36 and the remainder into accumulator 24. In effect this oscillation of the valve plunger 18 charges the accumulator 24 for the land 22 will function with the port 21 as a check valve permitting fluid to flow temporarily in one direction into accumulator 24. Now since some of the pumped fluid is still flowing into accumulator 99 the pressure therein continues to rise and thus correspondingly increases the force tending to shift the valve plunger 18 rightwardly. Eventually the plunger 18 will no longer completely close port 21 during intake stroke of piston 34 in which case fluid under pressure in accumulator 24 begins to exhaust fluid during intake stroke of piston 34. This has the effect of increasing the fluid pressure in the pump chamber 32 of the pump P during intake stroke and at the same time increases the minimum pressure of the pump cycle on the face 46 of pin 44 thereby correspondingly increasing the force tending to move the plunger 18 leftwardly. This progresses until the pressure in the pump chamber 32 during intake stroke increases substantially equal to the fluid pressure in conduit 101. Thereafter the check valve 35 no longer opens and fluid flow in the pump P is zero. At this condition the plunger 18 will have moved sufficiently to the right such that the entire pumping stroke displacement of the pump P passes into accumulator 24, and when the pump P is in the intake stroke of its cycle fluid to its chamber 32 is supplied entirely from the accumulator 24. At this time the outlet check valve 36 remains closed for the back pressure in the accumulator 99 prevents its opening as the maximum pressure of the pump P during pumping stroke does not exceed the pressure in accumulator 24. Since there is at this time no intake of fluid nor exhaust of fluid the work of the pumping stroke of the pump P is returned during intake stroke by the back pressure from accumulator 24. Thus the net result is that no work is being done by the pump P and thus the pump's efficiency is not reduced when the predetermined operating pressure in the fluid working circuit is attained. It will be observed that the variator 10 will obviously function if the stroke of the piston 34 of pump P is variable such as encountered in a free piston engine pump of the previously referred to type. Means will now be described for varying the operating pressure in the working circuit represented by the accumulator 99.

As viewed in FIGURES 3 and 7 it will be seen that if the element 48 is moved axially in a leftward direction it further increases the force exerted by the spring 47 on the plunger 18. This increase in force can only be balanced by an increase in pressure in the inner bore 39 of the plunger 18 which increased pressure must be derived from the pressure source in accumulator 99. Hence, it is apparent that further compression of spring 47 by leftward movement of element 48 serves to increase correspondingly the operating pressure in accumulator 99. Previously it has been described that movement of the piston 50 in the servo-motor 12 correspondingly moves the element 48. Thus leftward movement of piston 50 serves to increase the operating pressure in the accumulator 99. Means for controlling selectivity the position of piston 50 in the servo-motor 12 through operation of the servo-valve 13 will next be described.

As previously described the circumferential groove 67 in the servo-valve 13 is charged with fluid pressure from the working circuit pressure accumulator 99 through conduits 40, 98 and port 96 as evident from FIGURES 1, 3, 4 and 7 of the drawings. If the operator moves the lever 117 in a counterclockwise direction as viewed in FIGURE 5 the control valve element 84 will be moved to a new position leftward of the position shown in FIGURE 4. The land 88 uncovers port 79 thus permitting fluid under pressure to flow into circumferential groove 86, port 80, circumferential groove 68, port 96, conduit 58 (FIGURES 1 and 3), port 55 and into chamber 56 thus exerting fluid pressure on piston 50 of servo-motor 12 urging it in a leftward direction as viewed in FIGURE 3. Meanwhile the land 87 of the control valve element 84 also uncovers port 77 which communicates cylinder chamber 54 of the servo-motor 12 with sump 90 through port 53, conduit 57, port 95, circumferential groove 66, port 78, circumferential groove 85, port 77, circumferential groove 65 and port 91. Thus since cylinder chamber 54 communicates with sump 90 and cylinder chamber 56 is pressurized, piston 50 will move leftwardly as viewed in FIGURE 3. As piston 50 moves its connecting rod 51 being connected to valve sleeve 76 through arm 83 of lug 82 the valve sleeve 76 also moves leftward correspondingly as viewed in FIGURES 3 and 4. When piston 50 has moved leftwardly sufficient to again register port 79 in the valve sleeve 76 with the land 88 of the control valve element 84 the flow of fluid under pressure into chamber 56 of the servo-motor 12 will terminate and the further leftward movement of piston 50 will cease. At the same time port 77 in valve sleeve 76 will be again covered by land 87 of the control valve element 84 and thereby terminate exhaust flow of fluid from cylinder chamber 54 of servo-motor 12 to the sump 91. Thus the piston 50 of the servo-motor 12 is under hydraulic lock which prevents its movement in either direction unless fluid leakage occurs. Should such fluid leakage occur resulting in movement of the piston 50 the corresponding movement of the valve sleeve 76 again energizes the servo-motor 12 in a direction to move the piston 50 to the position corresponding to the selected position of lever 117 in respect of its dial plate 119. Movement of the lever 117 in a clockwise direction results in rightward movement of piston 50 in a similar manner.

From the foregoing it will be apparent that the piston 50 of the servo-motor 12 will always be maintained corresponding to the position of lever 117 in respect of its dial plate 119 and thus the operating pressure delivered by the pump P to the accumulator 99 may be controlled selectively by adjusting the position of the lever 117 with respect to its dial plate 119 and when the selected operating pressure is achieved no work is performed on the pump P and the only loss in efficiency is limited to mechanical friction of the pump P.

Having thus described a preferred embodiment of the invention it can now be seen that the objects of the invention have been fully achieved and it must be understood that changes and modifications may be made which do not depart from the spirit of the invention nor from the scope thereof as defined in the appended claims.

What is claimed is:

1. A fluid pressure variator for adjustably regulating the delivery pressure to a fluid working circuit from a pump chamber of a pulsating flow type fluid pump comprising a housing having first and second conduits, said first conduit being communicatively connected to said pumping chamber, a fluid accumulator communicatively connected to said second conduit, said accumulator having an operating fluid pressure capacity at least equal to the operating fluid pressure capacity of said pump chamber, a valve plunger interposed operatively between said first and second conduits, a spring disposed in said housing positioned to urge said valve plunger toward closed position, first hydraulic means disposed in said housing communicatively connected to said first conduit for urging said valve plunger toward closed position supplementary to the urging of said spring, a second hydraulic means disposed in said housing communicatively connected to said working circuit for urging said valve plunger toward open position, a movable element selectively positioned in said housing for varying the minimum compression of said spring, a hydraulic servo-motor disposed in said housing positioned to shift selectively the station of said movable element, and a servo-valve operatively connected to said servo-motor having a control valve element for telemetrically controlling actuation of said servo-motor whereby said accumulator is communicatively connected to said pump chamber to permit fluid flow therebetween in both directions when the fluid pressure in said working circuit approaches a predetermined value corresponding to the position of said control valve element.

2. A fluid pressure variator for adjustably regulating the delivery pressure to a fluid working circuit from a pump chamber of a pulsating flow type fluid pump comprising a housing having first and second conduits, said first conduit being communicatively connected to said pump chamber, a fluid accumulator communicatively connected to said second conduit, said accumulator having an operating fluid pressure capacity at least equal to the operating fluid pressure capacity of said pump chamber, a valve plunger interposed operatively in said housing positioned for communicatively connecting said first conduit with said second conduit, a spring disposed in said housing positioned to urge said valve plunger toward closed position, first hydraulic means disposed in said housing communicatively connected to said first conduit for urging said plunger toward closed position supplementary to the urging of said spring, a second hydraulic means connected to said working circuit positioned to urge said valve plunger toward open position, a movable element selectively positioned for varying the minimum compression of said spring, and telemetric means positioned to shift selectively the station of said movable element whereby said accumulator is communicatively connected to said pump chamber to permit fluid flow therebetween when the fluid pressure in said working circuit approaches a predetermined value.

References Cited in the file of this patent

UNITED STATES PATENTS

| | | |
|---|---|---|
| 635,667 | Cummings | Oct. 24, 1899 |
| 684,806 | Enzinger | Oct. 22, 1901 |
| 888,803 | Haskell | May 26, 1908 |
| 2,004,474 | Schaer | June 11, 1935 |
| 2,197,158 | Saharoff | Apr. 16, 1940 |
| 2,711,697 | Gibbs | June 28, 1955 |
| 2,740,357 | Plank | Apr. 3, 1956 |

FOREIGN PATENTS

| | | |
|---|---|---|
| 664,566 | Germany | Sept. 5, 1938 |